US008259764B2

(12) United States Patent
Fomenkov et al.

(10) Patent No.: US 8,259,764 B2
(45) Date of Patent: Sep. 4, 2012

(54) BANDWIDTH CONTROL DEVICE

(75) Inventors: Igor V. Fomenkov, San Diego, CA (US);
William N. Partlo, Poway, CA (US);
Daniel J. Reiley, San Diego, CA (US);
James K. Howey, Vista, CA (US);
Stanley C. Aguilar, El Cajon, CA (US)

(73) Assignee: Cymer, Inc., San Diego, CA (US)

( * ) Notice: Subject to any disclaimer, the term of this patent is extended or adjusted under 35 U.S.C. 154(b) by 1066 days.

(21) Appl. No.: 11/472,088

(22) Filed: Jun. 21, 2006

(65) Prior Publication Data

US 2007/0297467 A1    Dec. 27, 2007

(51) Int. Cl.
*H01S 3/136* (2006.01)

(52) U.S. Cl. ........... 372/30; 372/55; 372/61; 372/81; 372/98; 372/102; 372/29.021; 372/29.022; 372/31; 372/32; 372/29.02

(58) Field of Classification Search ........... 372/55, 372/61, 81, 98, 102, 29.021, 29.022, 31, 372/32, 30, 29.02
See application file for complete search history.

(56) References Cited

U.S. PATENT DOCUMENTS

| | | | | |
|---|---|---|---|---|
| 5,095,492 | A * | 3/1992 | Sandstrom | 372/102 |
| 5,970,082 | A | 10/1999 | Ershov | 372/102 |
| 6,094,448 | A * | 7/2000 | Fomenkov et al. | 372/102 |
| 6,192,064 | B1 | 2/2001 | Algots et al. | 372/99 |
| 6,212,217 | B1 | 4/2001 | Erie et al. | 372/102 |
| 6,493,374 | B1 | 12/2002 | Fomenkov et al. | 372/102 |
| 6,496,528 | B2 | 12/2002 | Titus et al. | 372/102 |
| 6,526,086 | B1 * | 2/2003 | Wakabayashi et al. | 372/69 |
| 6,532,247 | B2 | 3/2003 | Spangler et al. | 372/57 |
| 6,567,450 | B2 * | 5/2003 | Myers et al. | 372/55 |
| 6,778,584 | B1 * | 8/2004 | Partlo et al. | 372/99 |
| 2002/0127497 | A1 | 9/2002 | Brown et al. | 430/7 |
| 2004/0190578 | A1 | 9/2004 | Partlo et al. | 372/55 |
| 2004/0240506 | A1 | 12/2004 | Sandstrom et al. | 372/55 |
| 2006/0114956 | A1 | 6/2006 | Sandstrom et al. | 372/55 |
| 2006/0114957 | A1 * | 6/2006 | Algots et al. | 372/55 |
| 2006/0114958 | A1 | 6/2006 | Trintchouk et al. | 372/55 |

OTHER PUBLICATIONS

U.S. Appl. No. 11/016,682, filed Dec. 17, 2004, Titus et al.
U.S. Appl. No. 11/173,988, filed Jun. 30, 2005, Reiley.

* cited by examiner

*Primary Examiner* — Jessica Stultz
*Assistant Examiner* — Joshua King
(74) *Attorney, Agent, or Firm* — DiBerardino McGovern IP Group LLC

(57) ABSTRACT

A method and apparatus is disclosed for operating a laser output light beam pulse line narrowing mechanism that may comprise a nominal center wavelength and bandwidth selection optic; a static wavefront compensation mechanism shaping the curvature of the selection optic; an active wavefront compensation mechanism shaping the curvature of the selection optic and operating independently of the static wavefront compensation mechanism. The method and apparatus may comprise the nominal center wavelength and bandwidth selection optic comprises a grating; the static wavefront compensation mechanism applies a pre-selected bending moment to the grating; the active wavefront compensation mechanism applies a separate selected bending moment to the grating responsive to the control of a bending moment controller based on bandwidth feedback from a bandwidth monitor monitoring the bandwidth of the laser output light beam pulses. The active wavefront compensation mechanism may comprise a pneumatic drive mechanism.

45 Claims, 8 Drawing Sheets

BANDWIDTH CONTROL DEVICE

FIELD OF THE INVENTION

The present invention is related to active bandwidth control in high power, high repetition rate, very line narrowed excimer and molecular fluorine gas discharge laser systems, e.g., for use in integrated circuit manufacturing photolithography as a DUV light source, e.g., in KrF at around 248 nm nominal center wavelength and ArF at around 193 nm nominal center wavelength laser light sources.

CROSS-REFERENCE TO RELATED APPLICATIONS

The present application is related to U.S. Pat. No. 5,095,492, entitled SPECTRAL NARROWING TECHNIQUE, issued to Sandstrom on Mar. 10, 1992; and this application is related to U.S. Pat. No. 5,970,082, entitled VERY NARROW BAND LASER, issued to Ershov on Oct. 19, 1999; and this application is also related to U.S. Pat. No. 6,094,448, entitled GRATING ASSEMBLY WITH BI-DIRECTIONAL BANDWIDTH CONTROL, issued to Fomenkov et al. on Jul. 25, 2000; and this application is also related to U.S. Pat. No. 6,192,064, entitled NARROW BAND LASER WITH FINE WAVELENGTH CONTROL, issued to Algots et al. on Feb. 20, 2001; and this application is also related to U.S. Pat. No. 6,212,217, entitled SMART LASER WITH AUTOMATED BEAM QUALITY CONTROL, issued to Erie et al. on Apr. 3, 2001; and this application is also related to U.S. Pat. No. 6,493,374, entitled SMART LASER WITH FAST DEFORMABLE GRATING, issued to Fomenkov et al. on Dec. 10, 2002; and this application is also related to U.S. Pat. No. 6,496,528, entitled LINE NARROWING UNIT WITH FLEXURAL GRATING MOUNT, issued to Titus et al. on Dec. 17, 2002; and this application is also related to U.S. Pat. No. 6,532,247, entitled LASER WAVELENGTH CONTROL UNIT WITH PIEZOELECTRIC DRIVER, issued to Spangler et al. on Mar. 11, 2003; and this application is also related to co-pending U.S. patent application Ser. No. 10/820,261, entitled HIGH POWER GAS DISCHARGE LASER WITH HELIUM PURGED LINE NARROWING UNIT, filed Apr. 7, 2004, and this application is also related to U.S. patent application Ser. No. 10/808,157, entitled DUV LIGHT SOURCE OPTICAL ELEMENT IMPROVEMENTS, filed on Mar. 23, 2004, Published on Dec. 2, 2004, Publication No. US2004-0240506, and the application is also related to Ser. No. 09/967,695, filed on Sep. 26, 2001, entitled LARGE DIFFRACTION GRATING FOR GAS DISCHARGE LASER, published on Sep. 12, 2002, Pub. No. US-2002-0127497; and this application is also related to Ser. No. 11/000,571, filed on Nov. 30, 2004, entitled HIGH POWER HIGH PULSE REPETITION RATE GAS DISCHARGE LASER SYSTEM BANDWIDTH MANAGEMENT; and this application is also related to Ser. No. 11/016,682, filed on Dec. 12, 2004, entitled LINE NARROWING UNIT WITH FLEXURAL GRATING MOUNT; and the present application is related to Ser. No. 11/173,988, filed on Jun. 30, 2005, entitled ACTIVE BANDWIDTH CONTROL FOR A TUNED LASER; and this application is related to Ser. No. 11/254,282, filed on Oct. 20, 2005, entitled METHOD AND APPARATUS FOR GAS DISCHARGE LASER BANDWIDTH AND CENTER WAVELENGTH CONTROL; the disclosures of each of which are hereby incorporated by reference.

BACKGROUND OF THE INVENTION

As the requirements for smaller and smaller bandwidths continue to advance along with the integrated circuit design and manufacturing constraints necessary to follow Moore's law, and other associated beam parameter restraints, e.g., beam energy and bandwidth stability pulse to pulse over a relatively large number of pulses, e.g., hundreds of pulses, e.g., in a burst of laser light source pulses, e.g., used in exposing photoresist on an integrated circuit wafer, e.g., over a single die or a portion of a single die on such a wafer, e.g., as used in a photolithography scanner, the need to control laser light pulse wavefront becomes more and more critical, along with the need to ensure essentially constant wavefront pulse to pulse or at least to insure the entire laser system can react to and compensate for wavefront changes in relatively real time, e.g., pulse to pulse or almost pulse to pulse, to at least compensate for wavefront change effects within a burst, between bursts in preparation for a next burst and after a longer laser downtime than from burst to burst and also due to such changes in real time such as duty cycle. It is known that these types of changes in laser operation cause a number of effects, e.g., in the line narrowing module ("LNM") where bandwidth of the laser output is selected, and elsewhere, e.g., thermal effects, which influence wavefront and thus the operation of the LNM in selecting bandwidth, as is noted in at least one of the above referenced co-pending applications and issued patents of applicant's assignee, Cymer, Inc. It is also known to use stimulatable materials, e.g., electrically or magnetically sensitive materials, e.g., PZTs to bend and twist the grating of an LNM for the purpose of modifying the grating's shape to account for changes in wavefront. In addition, a motor driven bandwidth control device ("BCD") is known as shown in at least one of the above referenced applications or patents assigned to applicants' assignee Cymer, Inc., wherein a threaded shaft with a cooperating spring places compressive or tensile forces on a grating held in a mounting to which the BCD is attached, with the motor rotating the shaft for active grating bending control and thus wavefront adjustment. To varying degrees, however, the possible ways to apply the desired compressive and tensile forces have certain drawbacks to being able to actively control the grating shape for wavefront control, e.g., the addition of heat, and thus thermal effects, into the LNM and surrounding laser system modules or module components that can cause undesirable short term and/or long term wavefront transients. There is a need, therefore, for an improved mechanism for both passive and active control of the BCD in the LMN.

U.S. Pat. No. 5,095,492 referenced above relates to a line narrowing module (unit) with a bendable grating and bending the grating to compensate for beam divergence caused in the laser resonance cavity. U.S. Pat. No. 5,970,082, referenced above relates to a gas discharge laser with an unstable resonance cavity having a cylindrical mirror and a bendable grating to compensate for the wavefront modification due to the cylindrical mirror. U.S. Pat. No. 6,094,448, referenced above, relates to structural details of the grating bending mechanism, which is only passively used to control grating shape, though the '492 patent was incorporated by reference which discloses active control. U.S. Pat. No. 6,192,064, referenced above, relates to an LNM with various tuning means for tuning wavelength output to less than 0.1 pm using computer control in which also has a grating curvature mechanism using a stepper motor. U.S. Pat. No. 6,212,217, referenced above, relates to a gas discharge laser with an LNP having a bendable grating under computer control based on wavemeter feedback. U.S. Pat. No. 6,493,374, referenced above, relates to a wavefront correction means controlled by a computer to bend a grating in curvatures more complex than simple concave and convex shapes. U.S. Pat. No. 6,496,528, referenced above, relates to an LNM including purging means and a grating flexural mount that may be two parts of the mounting secured to the LNM housing and only one secured to the grating substrate or the two parts secured to the grating substrate and only one secured to the LNM housing, e.g., with an H-flex joint or a dovetail sliding joint. U.S. Pat. No. 6,532,247, referenced above, relates to a gas discharge laser system with an LNM with a piezoelectric grating illumination angle controlled with feedback control, including also a pivotable grating. Ser. No. 10/808,157, referenced above, relates to nominal center wavelength and bandwidth selection optics with flexure mounting. Ser. No. 10/820,261, referenced above relates to nominal center wavelength and bandwidth selections optics for generating multiple spectra with respective nominal center wavelengths separated by a selectable differential wavelength. Ser. No. 11/000,571, referenced above relates to a grating with different bending mechanisms to bend the grating in different ways, e.g., to change the ratio of an E95% bandwidth measurement to a FWHM bandwidth measurement. Ser. No. 11/173,988, referenced above relates to methods and apparatus for controlling wavefront and thus bandwidth using, e.g., optical elements in the laser cavity. Ser. No. 11/254,282, filed on Oct. 20, 2005, referenced above relates to an active bandwidth adjustment mechanism, e.g., controlling an active bandwidth adjustment mechanism utilizing an algorithm implementing bandwidth thermal transient correction, e.g., based upon a model of the impact of laser system operation on the wavefront of the laser light pulse being generated.

SUMMARY OF THE INVENTION

A method and apparatus is disclosed for operating a laser output light beam pulse line narrowing mechanism that may comprise a nominal center wavelength and bandwidth selection optic; a static wavefront compensation mechanism shaping the curvature of the selection optic; an active wavefront compensation mechanism shaping the curvature of the selection optic and operating independently of the static wavefront compensation mechanism. The method and apparatus may comprise the nominal center wavelength and bandwidth selection optic comprises a grating; the static wavefront compensation mechanism applies a pre-selected bending moment to the grating; the active wavefront compensation mechanism applies a separate selected bending moment to the grating responsive to the control of a bending moment controller based on bandwidth feedback from a bandwidth monitor monitoring the bandwidth of the laser output light beam pulses. The active wavefront compensation mechanism may comprise a pneumatic drive mechanism. The apparatus and method may comprise the static wavefront compensation mechanism comprising: a first bending moment force application plate affixed to a first end of the nominal center wavelength and bandwidth selection optic; a second bending moment force application plate affixed to a second end of the nominal center wavelength and bandwidth selection optic; a bending moment drive shaft mounted for movement in a longitudinal axis direction with respect to the first force application plate; a bending moment force application housing affixed to the second force application plate; a bending moment force application spring expanding or contracting in response to movement of the drive shaft relative to the first force application plate; the active wavefront compensation mechanism comprising: a bending moment force application mechanism connected to the bending moment drive shaft and applying a bending moment to the wavelength and bandwidth selection optic by moving the bending moment drive shaft without further changing the position of the drive shaft with respect to the first force application plate. the static wavefront compensation mechanism may comprise a threaded connection of the drive shaft to the first force application plate and a mechanism for rotating the drive shaft with respect to the first force application plate; and the active wavefront compensation mechanism may comprise a linear motion actuator.

The method and apparatus may also comprise a laser output light beam line narrowing mechanism which may comprise a nominal center wavelength and bandwidth selection optic; a static wavefront compensation mechanism shaping the wavefront of the beam incident on the selection optic; an active wavefront compensation mechanism shaping the wavefront of the beam incident on the selection optic and operating independently of the static wavefront compensation mechanism. The nominal center wavelength and bandwidth selection optic may comprise a grating; the static wavefront compensation mechanism may apply a pre-selected shape to the wavefront; the active wavefront compensation mechanism may apply a separate selected shape to the wavefront responsive to the control of a wavefront shape controller based on bandwidth feedback from a bandwidth monitor monitoring the bandwidth of the laser output light beam pulses. The active wavefront compensation mechanism may comprise a pneumatic drive mechanism. The static wavefront compensation mechanism may comprise a static wavefront correction mechanism operatively connected to a wavefront sensitive optical element to apply a wavefront correction having a wavefront correction setting; the active wavefront compensation mechanism may comprise an active wavefront correction mechanism operatively connected to the wavefront sensitive optical element, to make a wavefront correction without affecting the wavefront correction setting of the static wavefront compensation mechanism. The wavefront compensation mechanism may the shape of the selection optic. The wavefront compensation mechanism may modify a spatial relationship between at least one pair of optical elements in the path of the beam.

DETAILED DESCRIPTION OF PREFERRED EMBODIMENTS

Figure 1:
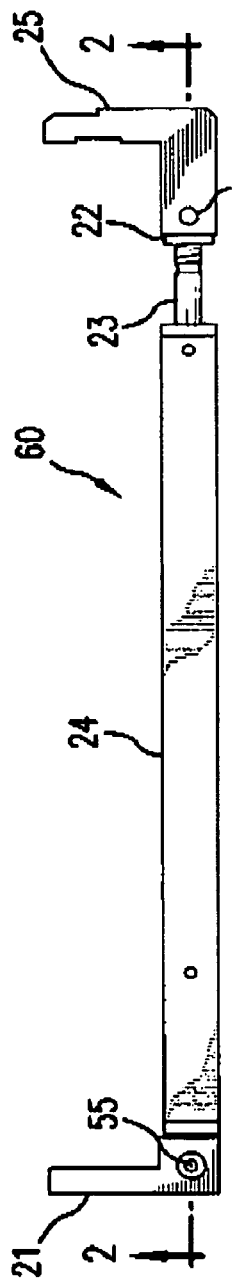
FIG. 1 shows an active bandwidth control device known in the art.

Applicants' employer has determined that there is a theoretical amount of bending of the LNM grating caused by turning the compression spring shaft on the BCD in a compressive direction or a tensile direction, called for convenience counter clockwise ("CCW") and clockwise ("CW"). Calculations have been made of beam wavefront change introduced by a given amount of grating bending. Wavefront measurements have been made showing changes in diffracted wavefront with BCD setting. Manufacturing data has been taken in an effort to correlation between grating power and the BCD setting, e.g., turns CW or CCW, e.g., from a neutral, non-bending position. Experimental data and theoretical calculations have been done to showing linewidth as a function of BCD setting.

With regard to the theoretical amount of bending caused by turning the BCD, calculations show that with regard, e.g., to the mechanical properties of the 35×35×250 mm ULE substrate, somewhat typical for the substrate for a grating having, e.g., nominal center wavelength and bandwidth selection grooves formed in a face of the grating, and the 52 lb/in spring rate of the BCD spring, which are listed in Table 1.

TABLE 1

| Number of turns of screw | Bend radius (m) | Sagitta (nm) |
|---|---|---|
| 0 | infinite | 0 |
| 1 | 42845 | 182 |
| 2 | 21423 | 365 |
| 3 | 14282 | 547 |
| 4 | 10711 | 729 |

In the calculation of beam wavefront change introduced by grating bending, if an r-5 grating with a small curvature in the x-direction has a sagitta (sag) of $sag_G$, it can be shown (by calculating the angles of incidence and diffraction at the ends of the grating) that, e.g., a diffracted Littrow wavefront will have a sag (or peak-to-valley x-direction power) given by:

$$sag_D = 2\, sag_G/5.$$

Using the data from Table 1, which shows that $sag_G$ changes by approximately 182 nm per BCD turn, one would expect the x-direction power of the diffracted wavefront to change by about 73 nm per turn. Correcting for the fact that this calculation assumes a grating length of 250 mm, while only a length 242 mm is actually used optically, the actual expected change in the x-direction power is about 68 nm per turn.

Wavefront measurements show changes in diffracted wavefront with BCD setting, e.g., the Zygo data collected by applicant's employer shows a sensitivity of 65 nm per turn, which is in excellent agreement with the theoretical value of 68 nm per turn.

Similarly, manufacturing data shows a connection between grating power and BCD setting, e.g., optics manufacturing data from 101 KrF single chamber laser system LNPs built during 2000. For each of these LNPs, the grating's x-direction power (measured before the BCD was attached) was noted, and the optimized BCD setting used during LNP test was recorded. These two parameters plotted against each other indicate a certain deviance from a straight line representing the theoretical relationship between grating power and BCD setting (i.e., 68 nm per turn). One would expect that the BCD setting needed to optimize the LNP performance would be that which eliminated the intrinsic power of the grating. The data shows this tendency, but the correlation is fairly weak ($r^2=0.34$) and it was seen that usually the grating is bent less than would be expected. This may be primarily due to the practice in LNP alignment of not bending the grating if the LNP is able to meet specifications with a relaxed BCD. In other words, the BCD may not have been truly optimized during LNP alignment.

Linewidth change has also been studied as a function of BCD setting, e.g., with the BCD in a cold condition, basically room temperature before the laser is run and hot, after the laser has been running for some defined time at some defined output. The "neutral" position of these curves, i.e., at a minimum bandwidth setting, may be determined, usually on the hot curve, where the laser will likely be operating. The cold curve often is displaced above and to the left of the hot curve, i.e., the minimum bandwidth is higher and the minimum point is at about 1 turn CCW from the hot neutral position, however, in the regions away from the minima of the hot and cold curves, it was noted that bending the grating changes the laser linewidth by about 0.05 pm per BCD turn, on average.

Making some simple approximations, one can compare these actual measurements to the linewidth change that would be expected theoretically. By differentiating the grating equation, it can be shown that angle errors in the incident beam causing wavelength errors in the diffracted beam are given by:

$$\Delta\lambda = \frac{\lambda \Delta\theta}{2\tan\alpha_{inc}}.$$

Turning the BCD will introduce incidence angle changes due to the grating curvature. As seen in the Table, each turn introduces a grating sag of about 182 nm, which corresponds to an angle change of about 2.8 μrad at the ends of the grating. Assuming an angle distribution with a FWHM ($\Delta\theta$) of about 2.8 μrad, and using $\lambda=248$ nm and $\alpha_{inc}=78.7°$, one can get a wavelength distribution with a FWHM ($\Delta\lambda$) of 0.07 pm. That is, each turn of the BCD will change the laser linewidth (bandwidth) by about 0.07 pm. Considering the crudeness of this calculation, the result is in reasonable agreement with the measured value of 0.05 pm per turn.

According to aspects of an embodiment of the present invention applicants propose to actively correct bandwidth transients by actively modifying the wavefront of the laser beam, e.g., by actively bending the grating, e.g., in response to real time or essentially real time feedback from, e.g., the bandwidth detecting mechanism(s) of the laser system. The grating may be bent to modify wavefront and/or to shape the grating to the laser beam's actual wavefront, or an approximation of that wavefront, e.g., by using PZT elements or voice coils or the like to bend/twist the grating. Unlike other actuation methods according to aspects of an embodiment of the present invention pneumatic actuation can be used without introducing any significant amount of heat into the LNM.

According to aspects of an embodiment of the present invention, a full-range manual actuation is continued to be enabled according to adjustments of the type discussed above, e.g., by placing a certain number of turns or partial turns in the CW or CCW direction, e.g., at the time of manufacture (or periodically during laser life) to set a sweet spot, e.g., for hot operation, which will then remain unchanged (between such adjustments) and whatever real time active grating bending mechanism that is employed will advantageously not modify this setting, as was not the case in the prior art motor driven rotation of the compression shaft in either the CW or CCW direction for bandwidth (wavefront) adjustment.

In addition, according to aspects of an embodiment of the present invention automatic actuation is also required. According to aspects of an embodiment of the present invention the mechanical (static setting) range may be such as to attain, e.g., the equivalent to a dual chamber laser system such as applicants' assignees' XLA series of MOPA configured laser systems, i.e., ±0.5 µm x-power, i.e., $sag_D$ in Table 1, in the reflected wavefront, while the automatic (active) setting must be sufficient to compensate for expected transients, e.g., variations of bandwidth with rep rate, target energy, aging of optical components, etc. According to aspects of an embodiment of the present invention it is desirable that components and materials be used in the environment of an LNM, e.g., a long grating LNM used in some of the above mentioned XLA laser systems, that do not degrade laser performance or lifetime, e.g., what applicants' assignee refers to as GRAS list components and materials. according to aspects of an embodiment of the present invention it is also desirable that actuation speed on the order of 0.1 pm, e.g., at FWHM/sec be available, e.g., on the order of the effect of a turn per second, e.g., for a standard (non-extended length) in which 0.1 pm of BW variation corresponds to about 1 full turn. Also according to aspects of an embodiment of the present invention it is also desirable that the active adjustment actuator be capable of delivering about 1 billion adjustments in its lifetime, assuming one adjustment per burst, 30 pulses/burst and a 30 Billion pulse lifetime. Also according to aspects of an embodiment of the present invention the actuator desirably results in no measured increase in vibration level of grating assembly in the LNM, e.g., compared to the design with static adjustment only, such that the actuator operation does not adversely affect WL stability, due to vibration effects only.

According to aspects of an embodiment of the present invention it is possible that an electromagnetic actuators may be utilized, e.g., a voice coil or like electromagnetic actuator. In such an embodiment, further mechanical advantage may be needed such that size and power dissipation requirement can be met. For example power dissipation requirements of <4 W for small grating LNM and perhaps a higher but not as yet known maximum power dissipation for a large grating LNM, measuring 60×60×360 mm, may be allowable, which remains to be determined, though zero is still the goal.

Large grating BCD curve measurements by applicants' assignee have clarified the force requirement electromagnetic actuation may be unsatisfactory. According to aspects of an embodiment of the present invention, e.g., for a large grating KrF BCD the curvature and force requirements for the actuator may be driven by the fact that the large grating BCD has a 92 lb/in spring and 28 threads/in on the screw. The size of the transient(s) for a large grating LNM is currently unknown, but is assumed to at least be no more than for a small grating LNM BCD. Typical transients seen by applicants' assignee have been on the order of, e.g., 50 fm, e.g., translating into ~8 turns of this BCD, or ~26 lbs. according to aspects of an embodiment of the present invention the automatic (active) actuator may, e.g., be preloaded by manual adjustment, e.g., of the number of turns on the existing compression spring shaft, so that the actuation range can, e.g., be centered around the minimum bandwidth position (or any desired operating point on the curve if operation away from the minimum is desired).

Based on applicants' employer's study of a number of OTS coils, and assuming that a custom design obeys the same scaling, >10 lb and <4 W, according to aspects of an embodiment of the present invention may lead to an unacceptably large coil. A mechanical advantage design, e.g., with a lever action, etc., may result in an effective design by trading displacement for force. A possible disadvantage of this approach may be that it is a more complicated design with potential for undesired coupling of the LNM grating assembly to the LNM housing, and/or lower resonance frequency(ies). Assuming 10 lb, 4 W, a single actuator may require k=~5, which implies a diameter >3 in, and this implies k=~1, which further implies 6 actuators, without mechanical advantage being used. The use of a solenoids have more-reasonable force constants, e.g., with the above assumptions, a single actuator requires k=~5, which implies dia=~1.3 in and a single actuator is possible, but two may be required for movement in both directions.

According to aspects of an embodiment of the present invention pressure may be controlled via an external pressure controller, which can, e.g., provide a pressure proportional to either a voltage or a current feedback signal. Pressure may be provided by gas lines that the laser already requires. According to an aspect of an embodiment of the present invention the preferred gas to use may be the gas that is also used to purging the LNM, e.g., helium. Other gases could also be used effectively, e.g., if the pneumatic lines inside the LNM are leak tight. According to aspects of an embodiment of the present invention, the bellows may be considered to be used in an unusual way, i.e., by the application of a force, while keeping the bellows movement to a negligible amount. Also, according to aspects of an embodiment of the present invention there can be independent manual and automatic actuation of the BCD.

According to aspects of an embodiment of the present invention advantages of using a pneumatic actuator, e.g., for the linear actuator portion of the BCD, include a lifetime likely to be infinite, in the sense that it will last much longer than other LNM components that need to be replaced after some operating life, usually done by swapping LNM modules on the laser system. Also of advantage is the fact that there is little of no change on the BCD forces. In addition there is no need to utilize other than GRAS materials in the linear actuator portion of the BCD. The linear actuator is simple to manufacture and operate. So far as speed is concerned, the pneumatic linear actuator can easily, with appropriate air pressure, e.g., 300 psi for the range of BCD movement, operate over the entire range of BCD compression spring linear movement in <<1 sec. Applicants do not believe that any added resonance issues will result from the pneumatic design. One very big advantage is that there is no intra-LNM housing power dissipation, thereby, e.g., removing temperature sensitivity issues from the operation of an active (automated) BCD bandwidth (wavefront) correction mechanism.

Figure 4:
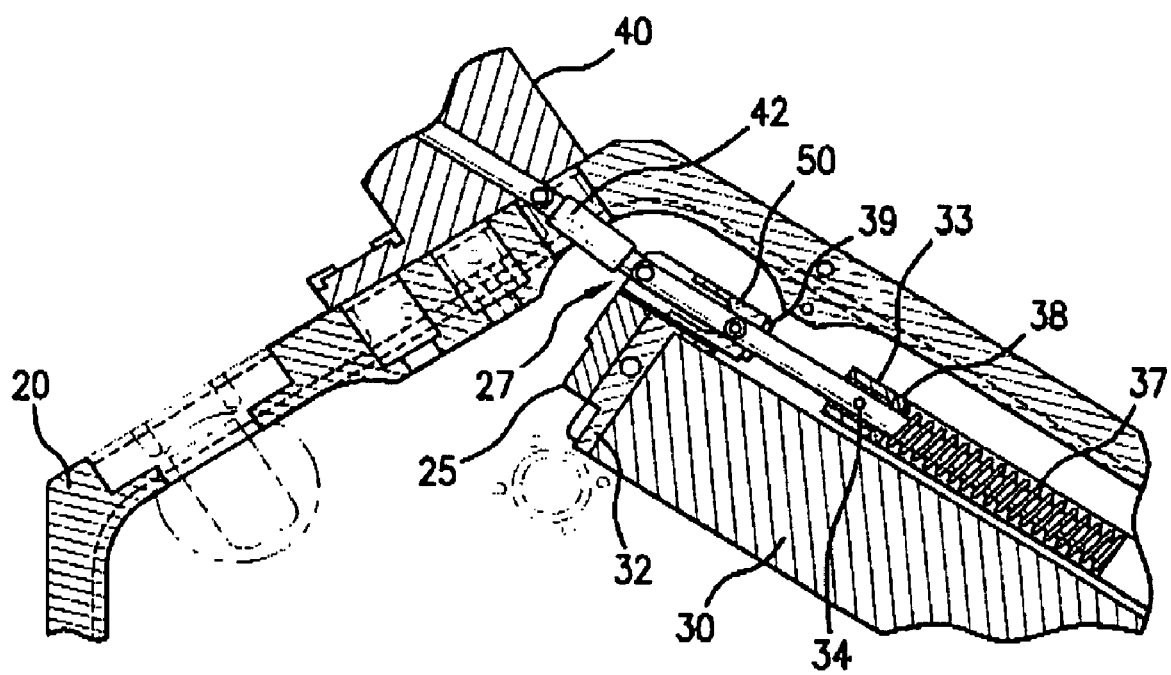
FIG. 4 shows an example of a portion of a line narrowing module containing a nominal wavelength and bandwidth selection grating according to aspects of an embodiment of the present invention.
Figure 5:
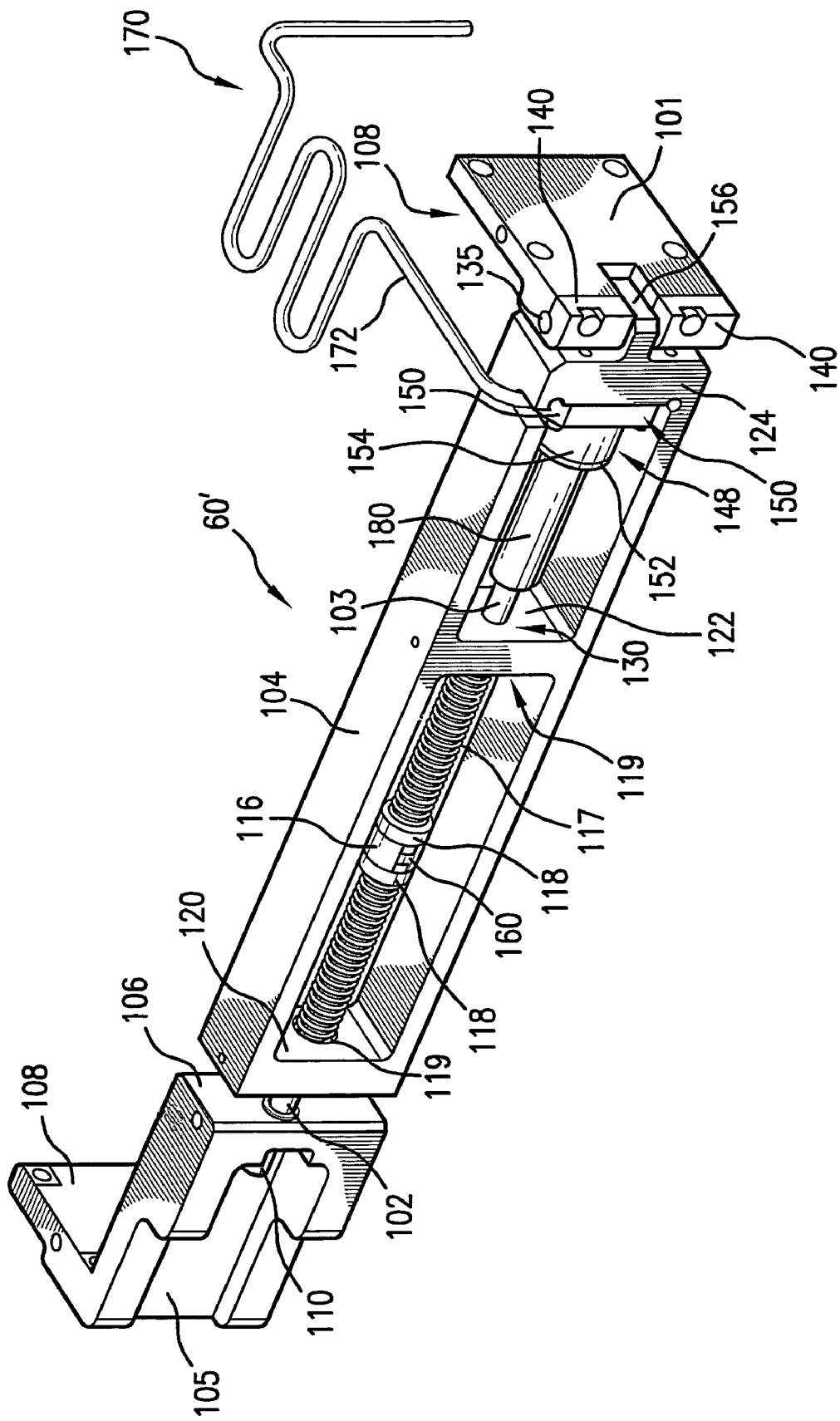
FIG. 5 shows an automated bandwidth control device according to aspects of an embodiment of the present invention.

Turning now to FIG. 1 there is shown a plan view of a prior art bandwidth (wavefront) control device 60, which may used as is known in the art to statically tune, e.g., a nominal center wavelength and bandwidth selection optic, such as a grating 30, shown, e.g., in FIG. 4. The grating 30 may be contained in a line narrowing module (unit) ("LNM"), which may have an LNM housing 20, also shown in FIG. 4. The BCD may have a BCD left end (as seen from the side 31 of the grating 30 containing wavelength and bandwidth selective grooves) plate 21 and a BCD right end plate 25, attached, as described in more detail below to a BCD all metal housing 24, which may be made, e.g., of aluminum. The BCD housing 24 may have a right end wall 62, a middle wall 63 and a left end wall 64.

Figure 11:
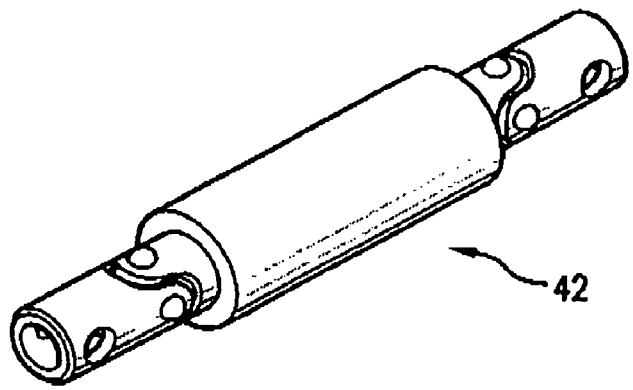
FIG. 11 shows a universal joint useful according to aspects of an embodiment of the present invention.
Figure 12A:
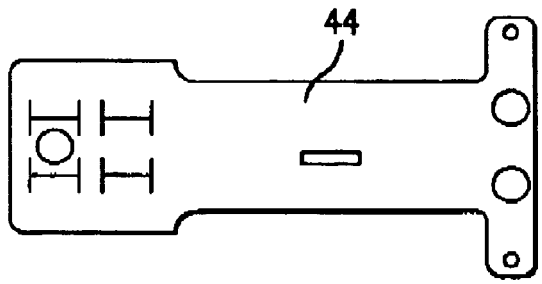
FIGS. 12A and B show partly schematically the top and bottom sides, respectively, of a grating mount useful according to aspects of an embodiment of the present invention.
Figure 12B:
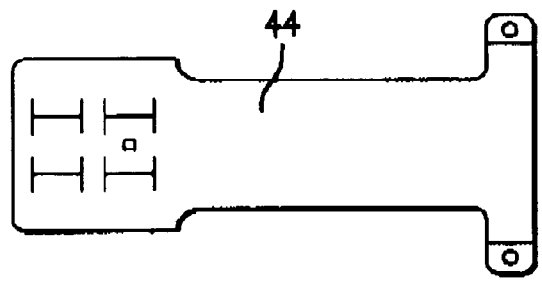

The left end plate 25 may have in an opening formed in an arm of the left end plate 25 a threaded brass bushing 22, into which may be threaded a threaded end of a compression spring shaft 23 having threads 26. The terminal end of the compression spring shaft 23 may have a small diameter compression spring shaft end 27, e.g., to which a turning mechanism (not shown) may be attached for purposes as described in more detail below. The turning mechanism, e.g., a universal joint 42, e.g., as shown in FIG. 11 may attach to the compression spring 23 at the terminal end by a drive joint connector pin, e.g., inserted into a hole 28 in the small diameter shaft end 37.

Figure 6:
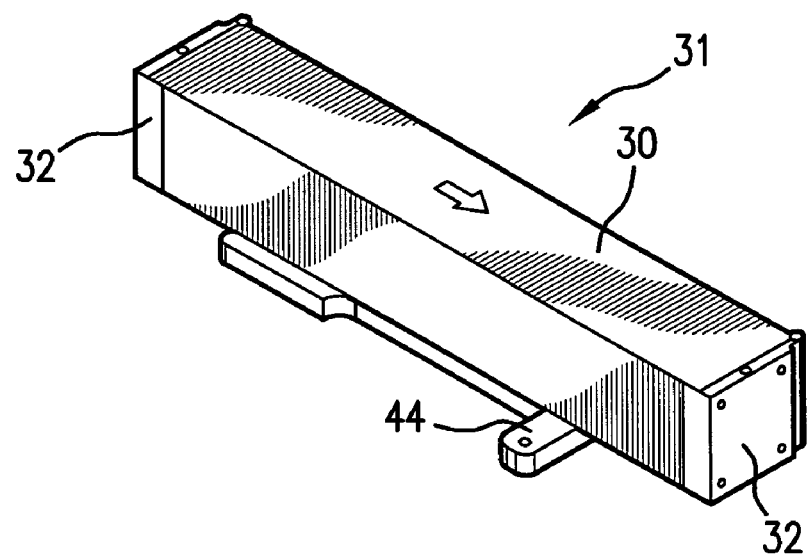
FIG. 6 shows a nominal center wavelength and bandwidth dispersive selection grating utilized in aspects of embodiments of the present invention.
Figure 7:
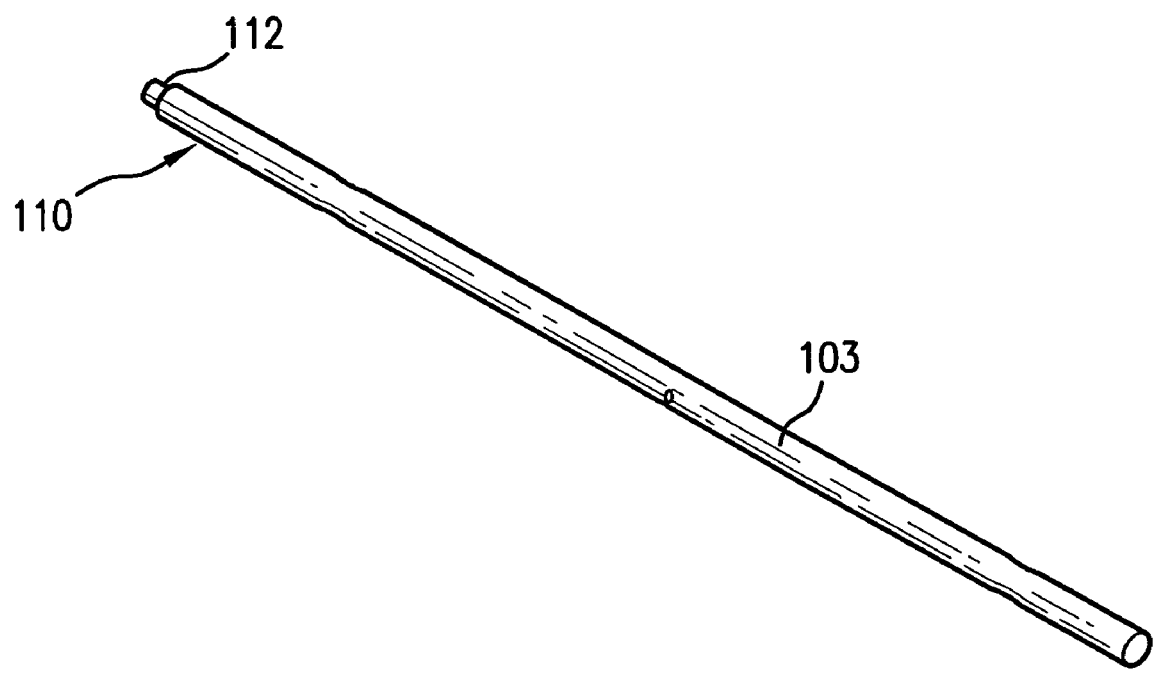
FIG. 7 shows a portion of an automated bandwidth correction device according to aspects of an embodiment of the present invention.

The grating 30, as shown, e.g., in FIG. 4 may be mounted to an LNM floor, e.g., by a grating mount 44, shown, e.g., in FIG. 6. Each of the grating end plates 32, may be attached to the ends of the grating, e.g., by a suitable epoxy adhesive, and in turn be connected, e.g., by screws 35 (shown, e.g., in FIGS. 14 and 15) to the respective left and right BCD end plates, 21, 25.

A compression spring piston 33 may be mounted on the compression spring shaft 30, e.g., by using a set screw 34. The opposing terminal end of the compression spring shaft 23 may have affixed, e.g., by a stainless steel roll pin 80 compression spring stop 36. On either side of the compression spring piston 33 may be mounted on the compression spring shaft 23 a stainless steel compression spring 37 (the embodiment in FIG. 4 showing, e.g., a configuration with only a single compression spring 37. On either side of the compression spring piston 37 may be mounted a steel thrust ball bearing 38 to connect the respective spring 37 to the piston 33.

Passing through the middle wall 63 and the left end wall 64 of the housing 24 may be a tubular brass bearing 50. A stainless steel thrust washer 39 may receive the end of the respective spring 37 opposite the end engaging the respective piston 33 bearing 38.

An external through the wall static setting drive mechanism 40, shown, e.g., in FIG. 4 may be connected, e.g., through a universal drive joint 42 to the end 27 of the compression spring shaft 23.

Figure 3:
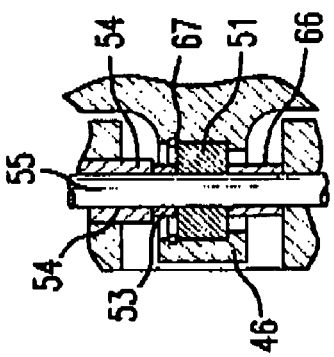
FIG. 3 shows an active bandwidth control device known in the art.

Turning to FIG. 3, there is shown a more detailed view of the cross-sectional view shown in FIG. 1 in the area of the right BCD plate attachment to a ground or trunnion shaft attachment flange 46, which may include, e.g., a chrome steel radial bearing 51, a stainless steel internal retaining ring, a stainless steel shaft spacer 53, an aluminum bore reducer 54m, and a stainless steel ground shaft (trunnion) 55, a stainless steel shaft spacer 66 and a stainless steel shaft spacer 67.

Figure 14:
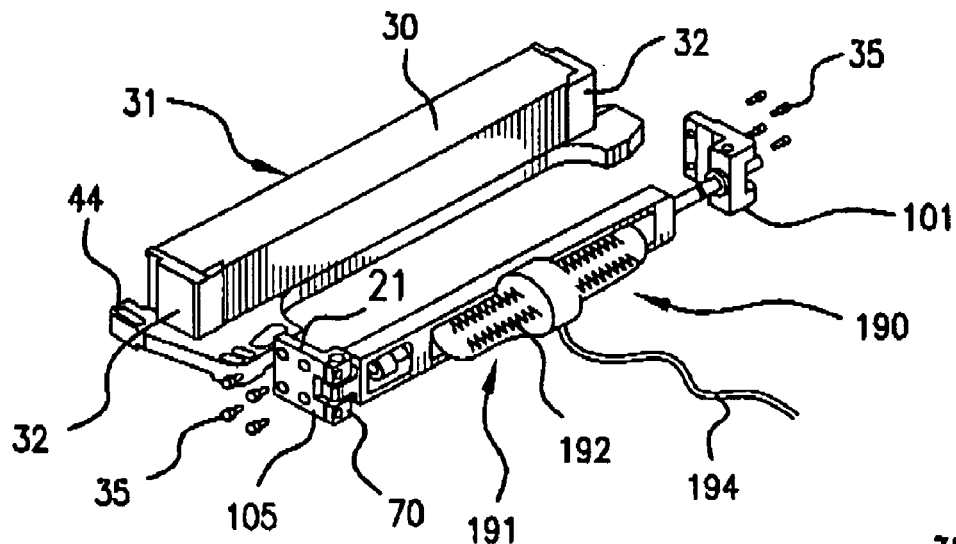
FIG. 14 shows schematically concepts relating to an automated bandwidth control device according to aspects of an embodiment of the present invention.
Figure 15:
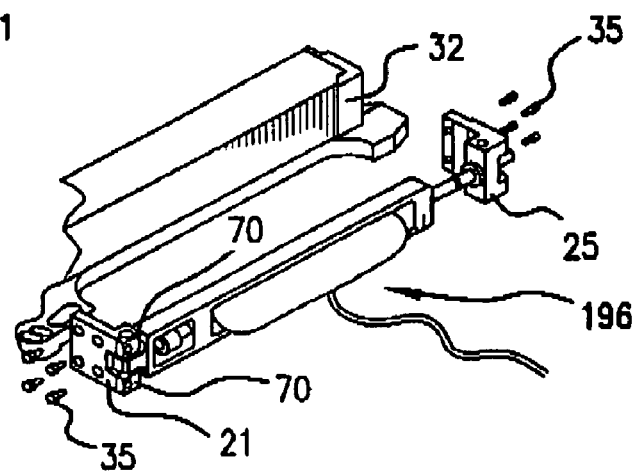
FIG. 15 shows schematically concepts relating to an automated bandwidth control device according to aspects of an embodiment of the present invention.

A cap screw 68 may clamp portions of a respective locking clamp portion 70 of the right BCD end plate 21, shown more clearly, e.g., in FIGS. 14 and 15, around the shaft 55 and the other internal components just referenced.

At least one stainless steel setscrew 69 may serve to hold the threaded bushing 22 in place in the BCD left end plate 25. At least one stainless steel setscrew 81 may serve to hold the bushing 50 in place in the housing end wall 64.

Figure 2:
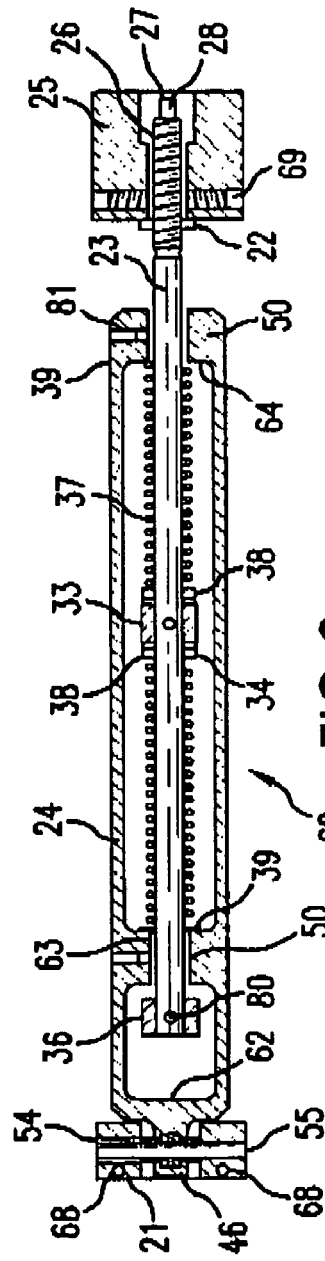
FIG. 2 shows an active bandwidth control device known in the art.

In operation of the embodiment of FIGS. 1-3, the compression spring drive shaft 23 may be rotated by a drive mechanism (not shown in FIGS. 1-3) but like the one shown as 40, e.g., FIG. 4. Rotating the compression spring shaft 23 threads 26 in the threaded bushing 22, since the distance between end plates 21 and end plate 25 is fixed by the attachment of end plates 21 and 25 to a respective grating end plate 32, results in the compression spring piston 33 moving inside of the opening in the BCD housing 24 between end wall 64 and middle wall 63 in one direction or another, depending on the direction of rotation of the compression spring shaft 23. This in turn puts, e.g., for leftward motion as shown in FIGS. 1-2, a compression force on the left hand spring 37, as shown in FIGS. 1 and 2 and a tensile force on the other spring 37. The action of the springs under this direction of motion of the spring piston tends to try to push the housing 24 away from the left end BCD plate. This in turn tends to put a compressive force on the face 31 of the grating 30 through the right and left end plates 21, 25 and the grating end plates 32. It will be also understood that, depending on the starting position of the force applying end plates 25, 21, rather than putting a compressive force on the grating face 31, such motion may serve to reduce an already existing tensile force on the grating face 31, a net force of the latter type causing the grating face 31 to assume a generally convex shape and of the former type a generally concave shape.

Such operation of a BCD for pre-setting and pre-tuning a grating, e.g., at the time of manufacture or periodically in the field is well known, as evidenced by one or more of the above reference patents and co-pending patent applications.

Turning now to FIGS. 5, 7, 8 and 9 there is shown an automated BCD 60' according to aspects of an embodiment of the present invention. The automated BCD ("ABCD") may have, e.g., a left end plate 101, and a 360 mm right end plate 105, e.g., slightly extended to hold a longer grating 30, e.g., one of 360 mm in length along the longitudinal axis (again, right and left being defined from the direction facing the grating face 31 when attached in the ABCD 60' between the end plates 101, 105. A brass threaded bushing 102 may pass, e.g., through a right end plate end wall 106 and be held in place by a set screw (not shown) inserted into a set screw hole, in similar fashion to the set screw(s) 69 in the BCD left end plate 25 shown in FIG. 1. The ABCD right end plate 106 may have a grating plate attachment face 108, as also may the ABCD left end plate 101.

A compression spring shaft 103 may extend through the threaded bushing 102 with threads 110 on that end of the compression spring shaft 103. The compression spring shaft 103 may further extend through an end wall 120 of the ABCD housing 104, made, e.g., from aluminum. A universal joint connector 112 (shown in FIG. 7) may serve to connect, e.g., a universal joint 42 (shown in FIG. 11) in the fashion of a through the wall drive mechanism such as that shown in FIG. 4.

Figure 13:
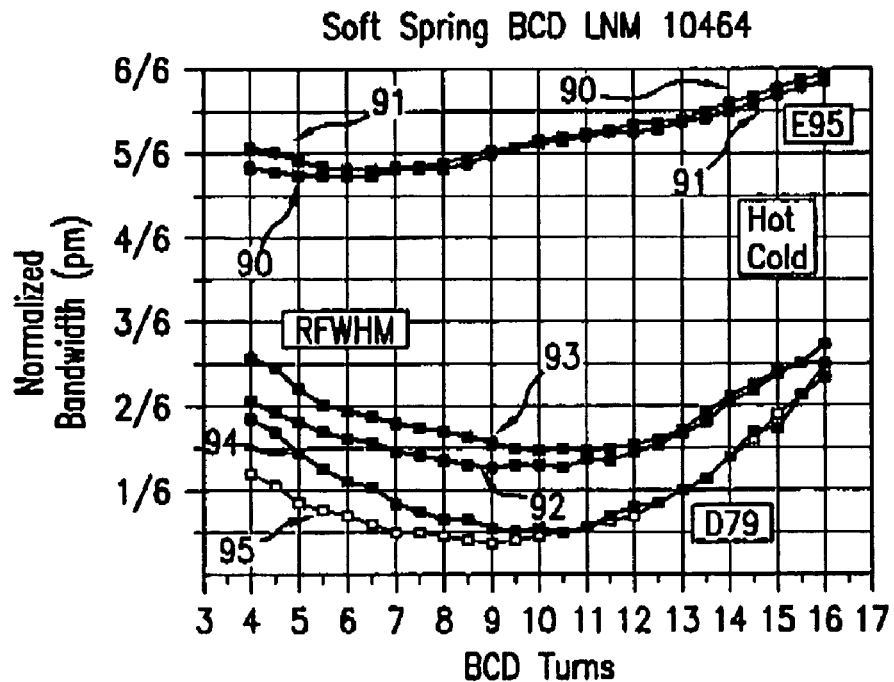
FIG. 13 shows measurements of bandwidth according to aspects of embodiments of the present invention.

A compression spring piston 116 may be attached to the compression spring shaft by, e.g., a stainless steel roll pin 160 in the fashion of pin 34 shown in FIG. 1. A 0.500" od, 2.50" l, 0.093"×0.061" chrome alloy die spring wire 117 (so-called by applicants' employer a "soft spring") may be attached on either side of the piston 116 by a respective steel thrust ball bearing 118. The respective opposite ends of the springs 117 may engage the respective walls 120, 122 of the housing 104 through a respective 440 stainless steel thrust washer 119. A brass tubular bearing 130 (one shown in FIG. 5) may hold the compression spring shaft in passage through the walls 120, 122. FIG. 13 illustrates an effect of using the soft spring, i.e., the cold and hot curves 90, 91 respectively for E95 and 92, 93 respectively for FWHM and 94, 95 for D79, a designation of a signal out of a bandwidth measuring instrument on-board a laser system such as those sold by applicants' assignee from an array of photodetectors, e.g., indicative of a fringe width used to determine an estimate of the bandwidth of the laser in operation, are less displaced from each other vertically and horizontally that similar curves measured in the past for "stiff" springs.

Similarly to the connection of the BCD right end plate in FIGS. 1 and 2 to the trunnion flange 46 on the BCD housing 24 in FIGS. 1 and 2, the left end plate 101 of the ABCD 60' may be connected using a chrome steel radial bearing (not shown), a stainless steel internal retaining ring (not shown), a stainless steel shaft spacer (not shown), and aluminum bore reducer (not shown) and a 303 stainless steel ground shaft 135, all held in place by clamp portions 140, clamped over the internal components by set screws 143 to a trunnion/ground shaft flange 156.

Figure 17:
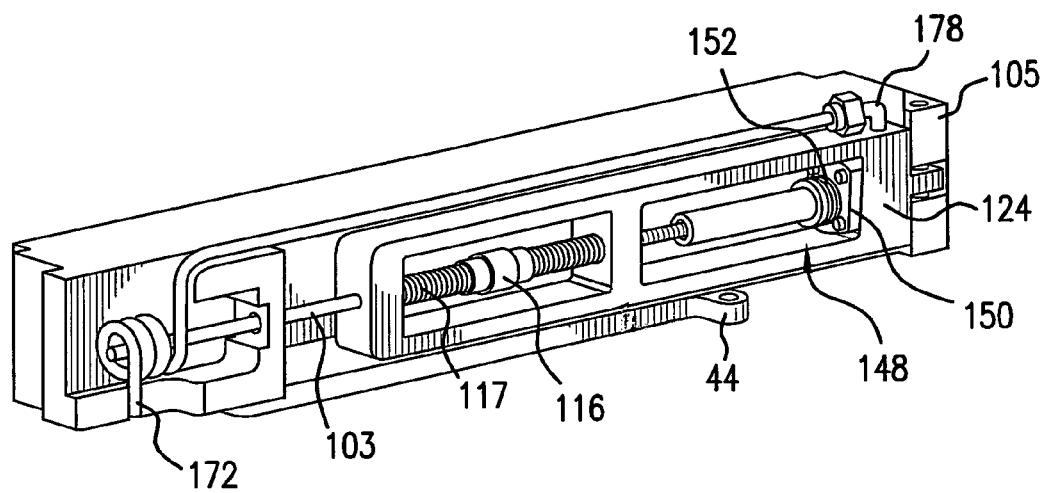
FIG. 17 shows aspects of an alternative embodiment of the embodiment of FIGS. 5, 8 and 9.
Figure 18:
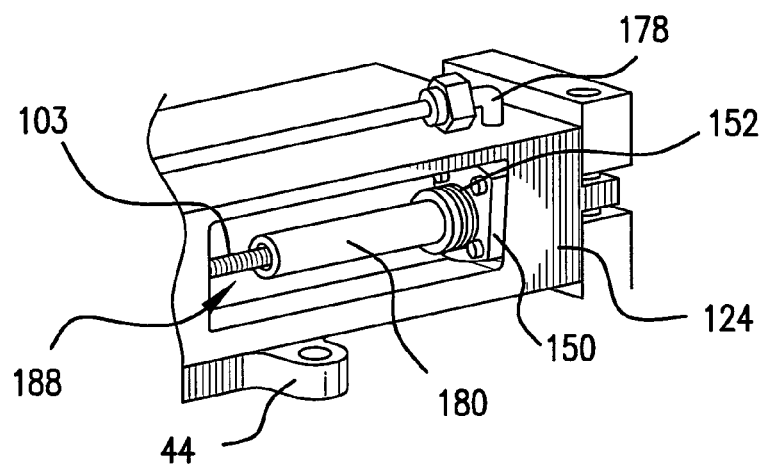
FIG. 18 shows a portion of the embodiment of FIG. 17.

A bellows 148, including a bellows mounting plate 150 may be attached to the end wall 124 of the housing 104 and may have corrugations 152 and a drive cylinder attachment plate 154, to which may be attached by suitable means, e.g., by welding or by forming an integral part therewith, a hollow linear drive cylinder 180. The bellows 148 may include a hollow bellows mounting plate interior 176. Pneumatic air pressure may be supplied from an air pressure controller (not shown) in a pneumatic air pressure supply system 170 through an air supply line, which may attach directly to the bellows interior 176, as by welding (not shown in FIGS. 8 and 9) or through an air connection fitting 178, shown in FIGS. 17 and 18.

Figure 8:
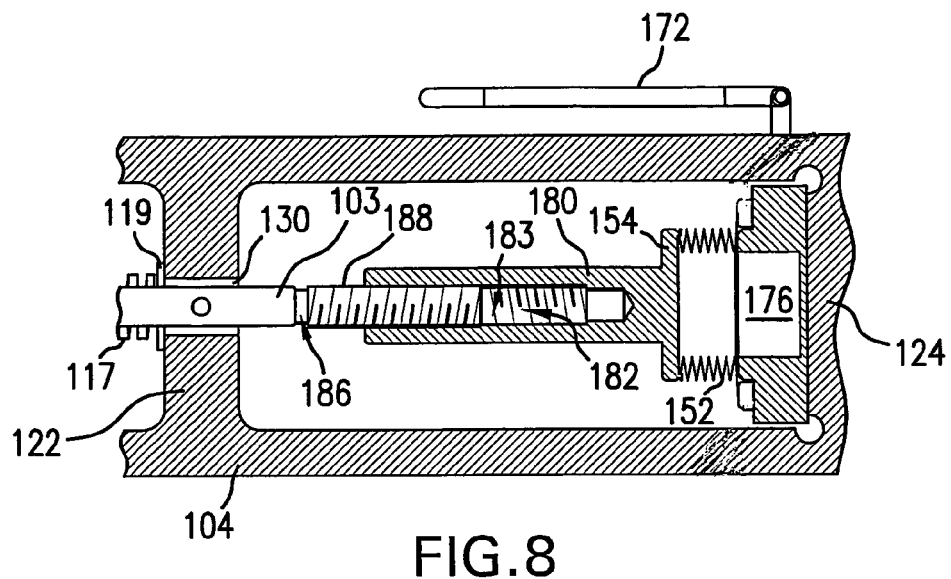
FIG. 8 shows an automated bandwidth control device according to aspects of an embodiment of the present invention.
Figure 9:
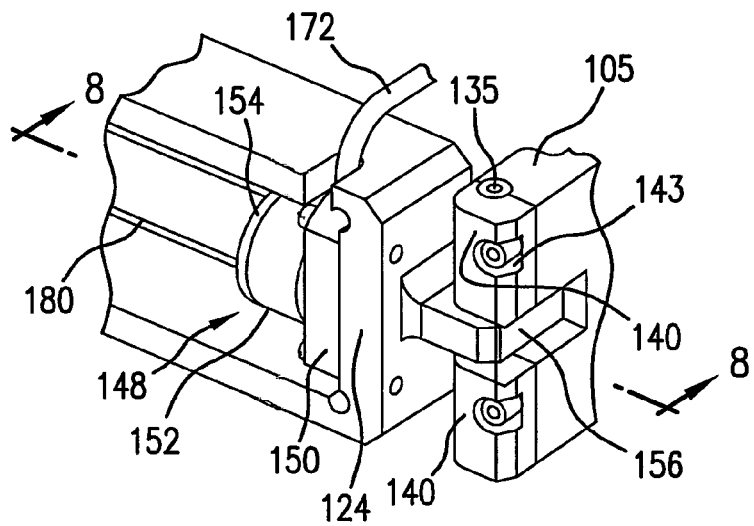
FIG. 9 shows an enlarged view of a portion of the embodiment of the present invention shown in FIG. 5.

As can be seen in more detail in the cross section of FIG. 8, along the section lines of FIG. 9, a hollow tubular linear actuator bellows extension cylinder 180 may have a threaded linear actuator interior opening 182, e.g., containing threads 183. The compression spring drive shaft 103 may be formed with a neck 186 and thereafter threaded with threads 188 toward the terminal end of the compression spring drive shaft at the ABCD left end plate 105 end of the ABCD 60'.

It will be understood that in operation the ABCD portion containing the compression spring drive piston 116, and compression spring 117, between the end walls 120, 122 may be operated in essentially exactly the same way as the BCD of FIGS. 1-3 and somewhat similarly to the single spring embodiment of the BCD of FIG. 4, as described above. In this fashion, e.g., by operating the through the wall drive mechanism like that shown as 40 in FIG. 4, but not shown in FIG. 5, to set the position of the compression spring piston 116 for some selected tuned position for bandwidth performance, either at the time of manufacture, or periodically in the field, and that position of the mechanism applying force on the grating face, compressive or tensile, as selected, will remain fixed, as in the prior art BCD.

At the same time in the identically threaded opposing end of the compression spring drive shaft threading into or out of the tube 180 prevents the turning of the compression spring shaft from extending or compressing the bellows corrugations 152. This enables the construction of a cheaper bellows which has to sustain pressure over a much smaller extent of travel than if the bellows moved with the rotation of the compression spring shaft 103 as it threaded into or out of the threaded bushing 102 at its other end. This also insures that the bellows 148 can have a full range of motion of the bellows plate 154, right to left as shown in FIG. 8.

Figure 10:
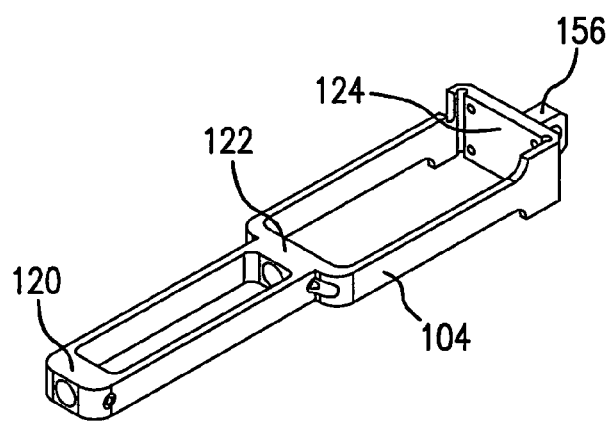
FIG. 10 shows an alternative embodiment of a bandwidth control device housing according to aspects of an embodiment of the present invention.

Turning now to FIG. 10 there is shown a light weight version of the housing 104 according to aspects of an embodiment of the present invention in which the end walls 120, 124 and center wall 122 remain generally of the same thickness in the longitudinal direction, but the lateral dimensions thereof and of the arms connecting the walls 120, 122, 124 are reduced to save weight while retaining sufficient length for the automated bandwidth control device according to aspects of an embodiment of the present invention to operate as described.

Turning now to FIG. 14 there is shown schematically and partly in cartoon form an automated bandwidth control device having, e.g., a pneumatic linear actuator which may replace the bellows 148 of the embodiment(s) of FIGS. 5, 8, 9, 17 and 18. I may comprise, e.g., a pneumatic linear actuator with two bellows 190, 191, positioned on opposite sides of a pneumatic air pressure plenum 192 being supplied with high pressure air through a supply line 194. The bellows 191, e.g., may be constructed to have a hollow interior into which a compression spring shaft may be threaded as the manual portion of the automated BCD, shown, e.g., in FIG. 16, but omitted from the schematic view of FIG. 14. The pneumatic linear actuator of FIG. 14 may also be constructed, as illustrated schematically, to replace the manual portion of the BCD, i.e., the compression spring shaft 23, piston 33 and springs 37, e.g., as illustrated in FIG. 2 constructed with the pneumatic actuator in place of the manual actuator of FIGS. 1-3.

Turning now to FIG. 15 there is shown aspects of an embodiment of the present invention schematically and partly in cartoon format. This shows a stimulated actuator, e.g., a electro or magneto stimulated actuator, e.g., a piezoelectric material, e.g., PZT 196, which changes shape or seeks to change shape when exposed to an electric field, in the place of the pneumatic actuator according to aspects of an embodiment of the present invention illustrated in FIG. 14.

Figure 16:
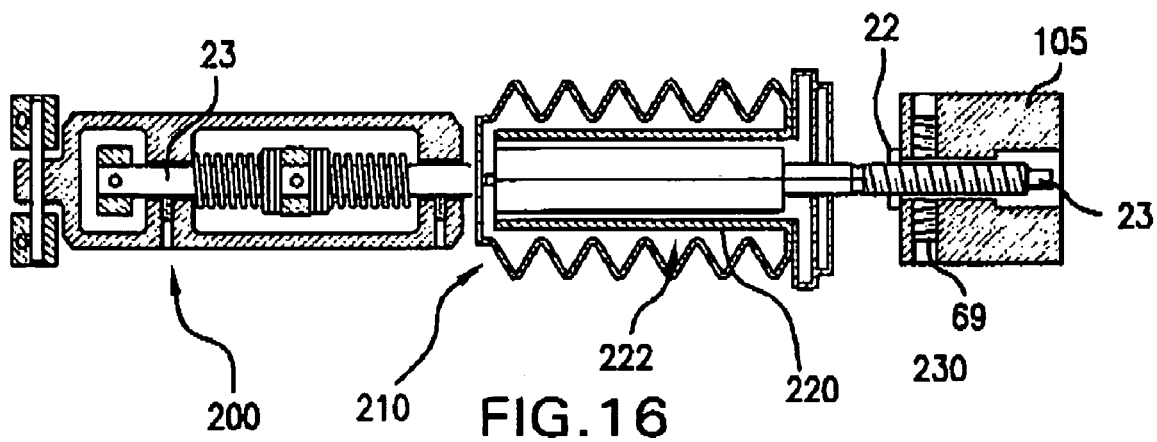
FIG. 16 shows schematically concepts relating to an automated bandwidth control device according to aspects of an embodiment of the present invention.

Turning now to FIG. 16 there is shown schematically and partly in cartoon format aspects of an embodiment of the present invention. The embodiment of FIG. 16 may include, e.g., a shortened BCD housing 200 for the pre-selected manual non-variable setting of wavefront selection. Aspects of the embodiment may also include a steel bellows 210, serving to, e.g., isolate a linear actuator 220 from the ambient environment of the LNM (rather isolating the interior environment of the LNM from the actuator). The actuator 220 may, e.g., be contained within a rigid sleeve 222. The sleeve 222 may, e.g., be connected to a sealing flange 230, which may in turn, e.g., be connected to the threaded end portion of the compression spring shaft 23, e.g., as shown in FIGS. 1-3 and also to an end of the compression spring shaft 23 exiting the thrust bearing 50. In operation, the linear actuator, e.g., a piezoelectric material, a linear stepper motor or the like may be attached to rotate with the compression spring shaft 23 while the manual setting is fixed and then move the compression spring shaft linearly for active wavefront (bandwidth) control. The actuator, due to rotation, would need, e.g., to have some form of commutator to pass electricity to the actuator 220. Alternatively, e.g., the actuator and flange 230 could be mounted, e.g., on a hollow tube containing the compression spring shaft 23, e.g., to allow the shaft 23 to rotate without rotating the actuator 220, and some mechanism (not shown) to physically connect the actuator 220 to the shaft 23 when linear motion of the shaft 23 is required (desired).

According to aspects of an embodiment of the present invention a pneumatically actuated linear actuator for an ABCD can, e.g., provide the equivalent of 0-11 BCD turns in either direction, e.g., from the fixed position of the wavefront (grating curvature) control, e.g., fixed by selecting the initial number of BCD turns, i.e., the initial setting for the position of the piston 116, set before the separate linear actuation, e.g., pneumatic actuation is utilized. With, e.g., about 100 psi of pneumatic air pressure applicants believe that this can be accomplished. As noted during manual actuation, the BCD compression spring shaft can, e.g., turn inside the threaded bushing. Manual actuation can include, e.g., through the wall setting of the piston position (number of turns CW or CCW) either by manual turning of the compression spring shaft or motor driven turning of the compression spring shaft, with "manual" setting meaning the initial setting for maximizing bandwidth performance on a one time (at manufacture) or an infrequent perhaps periodic basis for performing in the field maintenance.

Using the formula $F=P*A+kx$, where $kx=$(spring rate of the bellows*stroke) and is unknown to applicants at this time, and, e.g., a Minimum operating pressure of about 620 kPa (90 PSI) and a maximum operating pressure of about 720 kPa (104 PSI) the calculated minimum bellows size, e.g., for bellows 148, would be about 0.522 in od and 0.218 in id, with an effective area$=(OD+ID)^2*0.1963$, i.e., about 10 in$^2$, the minimum force would be about 9 pounds+kx, and the maximum force would be about 10.4 pounds+kx. For a maximum bellows size, e.g., with an OD=0.991 in and an ID=0.70 in, with the effective area=0.561 in$^2$ Min. The minimum force would =50.5 pounds+kx and the maximum force would =58.3 pounds+kx. For a spring rate= about 20 lb/in and a max stroke= about 0.25 in, one could also consider for the present application kx or stroke to be negligible and should be considered =0. Thus application stroke=0, and kx=20 lb/in*0 or kx=0. The formula $F=P*A+kx$ could only be used for the lowest or worst case scenario of 620 kPa (90 PSI), such that F=90 PSI*0.561 in$^2$+0, i.e., 50.5 lbs. As a force multiplier applicants propose, e.g., a lever, e.g., having a force multiplier of 13.7:1. The force applied (at end points of the lever) is proportional to the ratio of the length of the lever arm measured between the fulcrum and application point of the force applied at each end of the lever. Therefore $F=Fi*Fl$ where Fi=initial force and Fl=lever multiplier Force, thus, e.g., F=50.5 lbs*13.7=691.85 lbs.

Utilization of a stimulatable material, e.g., PZT, can provide a lifetime that is likely to be infinite, i.e., as noted above when compared to the component life of other critical components like to need replacement, e.g., in the LNM long before any failure of a PZT element under normal failure conditions. There may be a need, however, to change to BCD forces, e.g., where the PZTs needs to be normally in compression. As noted, bellows sealing can address the lack of a suitable material for the actuator that is also GRAS compliant. the speed of movement over the range of movement is also acceptable. Applicants believe that there will be no temperature concerns from power dissipation due to, e.g., PZT operation. The coefficient of thermal expansion seems to be acceptable for, e.g., PZT material.

According to aspects of an embodiment of the present invention other linear actuation schemes/mechanisms may be employed, e.g., a Rotary vacuum feedthrough—scheme, which may have a lifetime issue, e.g., based on actuation motor life of about millions of actuations. No need to change the to BCD forces would exist, however. Some accommodation for motor materials may be necessary for GRAS reasons. However the speed can be slower, e.g., 2 sec/turn. Power dissipation, however, is not an issue according to applicants' understanding.

Another possible option is to use a magnetostrictive linear motor, which according to manufacturer information can provide hundreds of Newtons of holding force without any power dissipation (power is consumed only during motion). Such an actuator can be obtained from Energen, Inc.

According to aspects of an embodiment of the present invention the use of pneumatic BCD control satisfies a number of criteria for an effective and efficient ABCD control mechanism, namely, acceptable Lifetime, minimal changes to the forces exerted on the BCD, utilization of only GRAS (, e.g., non-fluorine reacting materials for certain applications) materials, acceptable actuator cost, minimum of LNM modifications, available control hardware, actuation speed, minimum impact on laser performance, the ability to utilize intra-LNM power dissipation, and temperature sensitivity.

For an electromagnetic implementation according to aspects of an embodiment of the present invention Lifetime was deemed to likely be well beyond the required lifetime for this application. As far as changes to the GCD forces, the actuator itself would weigh about 1 lb. To limit the use to only GRAS materials would require a custom actuator, but is doable. Regarding LNM modifications the actuator was small enough to probably fit within the LNM enclosure currently use for LNM's in applicants' assignee's laser systems. Current control is relatively easy to implement and the design can be made, e.g., without the use of limit switches. Speed of operation involves, e.g., very much less than about one second for full range of control actuator motion. There are, however, some laser performance issues concerning, e.g., resonances. The intra-LNM power dissipation can be kept to about 10 W, which seems acceptable. Temperature sensitivity would not likely be an issue if current-control is used. Possible factors on the negative side included availability of actuators with acceptable materials, or the means of isolation to use other materials, the lifetime of "permanent" magnets, and the actual effects of resonances.

For a linear actuator, e.g., in order to avoid the consequences of the actuator comprising non GRAS materials, the non-GRAS-compliant linear actuator may be isolated from the rest of the LNM, e.g., by being contained in a sealed bellows.

According to aspects of an embodiment of the present invention an example of a linear actuator may be a Thorlabs Z606, 6 mm travel, 425 um/sec, 20 lb load voice coil actuator (not shown). The ABCD driver can provides an adjustable current for the voice coil actuator. It shall monitor the control signal from the micro-processor then it sends an appropriate current to the voice coil actuator. The BCD driver is used for the voice coil actuator (+/−2 Amps, <0.2 sec, 12 VDC) The BCD driver as currently used for operating the manual BCD adjustments in an active mode, e.g., by rotating the compression spring shaft, e.g., away from the fixed setting, e.g., during active wavefront (bandwidth) control, may be used, e.g., to provide, e.g., a control signal used for a voice coil actuator, e.g., with (+/−2 Amps, <0.2 sec, 48 VDC).

Applicants employer has conducted experiments regarding the differences in performance between the older versions of a BCD and the newer soft spring version. For example as BCD using the prior springs that seemed to be most out of specification in testing was refitted with the soft springs and Zygo data, i.e., wavefront measurements, taken which indicated, e.g., that the power-X for the soft springs had a much lower slope, i.e., 0.0558x+0.7054 with an $R^2$ of 0.9989 as opposed to 0.1146x=1.4444 with an $R^2$ of 0.9753 for the soft springs.

Applicants' employer has examined, e.g., the maximum curvature an ABCD must correct, and preliminary calculation, based upon the fact that all prisms and Rmax in the LNM have x-axis cylinder error $\lambda/20$, while the grating has $\lambda/5$, and the grating, e.g., needs about $1.1\times10^7$ mm radius of curvature to correct all x-axis cylinder error, as simulated by ZEMAX, lens design software, a requirement of ±3.9 turns of a soft spring BCD or ABCD. Where all the prisms have a $\lambda/20$ x-axis cylinder error, and the Rmax and grating have x-axis cylinder error $\lambda/5$, the grating needs $0.5\times10^7$ mm radius of curvature to correct all x-axis cylinder error, as also simulated by ZEMAX, with the resultant requirement of ±9.3 turns of soft spring BCD or ABCD. The soft spring version can accommodate either condition.

The pneumatic pressure generator can be a model QB1TFIE100 pneumatic pressure generator (not shown), made by Proportion-Air of McCordsville, Ind., USA, connected to the end of the pneumatic pressure supply line 172.

It will be understood by those skilled in the art that a method and apparatus are disclosed for operating a laser output light beam pulse line narrowing mechanism which may comprise a nominal center wavelength and bandwidth selection optic, a static wavefront compensation mechanism, and an active wavefront compensation mechanism operating independently of the static wavefront compensation mechanism. The nominal center wavelength will be understood to mean that in accordance with the operation of known nominal center wavelength and bandwidth selection units, e.g., in an LNM, e.g., using a grating dispersive element, a desired center wavelength is selected for control by the wavelength control system and is maintained, e.g., pulse to pulse by the control system, though in any given pulse the actual center wavelength for the given pulse may vary within so tolerance of the control system, e.g., a few femtometers, such that the actual wavelength for any given pulse may or may not be the desired nominal center wavelength. The nominal center wavelength and bandwidth selection optic may comprise a grating and the static wavefront compensation mechanism may apply a pre-selected bending moment to the grating, and the active wavefront compensation mechanism may apply a separate selected bending moment to the grating responsive to the control of a bending moment controller based on bandwidth feedback from a bandwidth monitor monitoring the bandwidth of the laser output light beam pulses. This separate wavefront (bandwidth) control may be separate from the manual pre-selected ABCD, setting, e.g., the preselected position of the compression spring piston, e.g., due to a given number of turns or partial turns, CW or CCW, selected at the time of manufacture or periodically thereafter, e.g., during maintenance. The separate active wavefront compensation mechanism may comprise a linear actuator that, e.g., puts a force in one direction or another, e.g., on the compression spring shaft, e.g., with a pneumatic drive mechanism. This may then change the applied curvature selection force on the grating, e.g., to move it away from the static preselected optimum operating point as initially selected or periodically selected curvature force (number of turns) as noted above. The preselected static wavefront compensation mechanism may comprise a bending moment drive shaft, a bending moment force application spring and a bending moment force application piston/carriage, e.g., mounted on the drive shaft to change the bending moment force applied by the bending moment force application springs, e.g., as a threaded portion of the compression spring shaft is rotated in a fixed threaded bushing to change the position of the shaft relative to the bushing. The active wavefront compensation mechanism may comprise a bending moment force application mechanism connected to the bending moment drive shaft, e.g., a compression spring shaft, and applying a bending moment to the nominal center wavelength and bandwidth selection optic by, e.g., moving the bending moment drive shaft, e.g., with respect to a housing of the ABCD, e.g., without rotating the shaft, i.e., further changing the position of the shaft with respect to the manual actuator, e.g., changing the position of the shaft vis-a-vis the threaded bushing. Thus explained, the active wavefront compensation mechanism is said to be operating independently of the static wavefront compensation mechanism. The active wavefront compensation mechanism may comprising a linear actuator.

It will further be understood by those skilled in the art that the static wavefront compensation mechanism may apply a pre-selected bending moment to the grating and the active wavefront compensation mechanism may apply a separate selected bending moment to the grating responsive to the control of a bending moment controller based on bandwidth feedback from a bandwidth monitor monitoring the bandwidth of the laser output light beam pulses. The active wavefront compensation mechanism may comprise a pneumatic drive mechanism. The apparatus and method may comprise the static wavefront compensation mechanism comprising: a first bending moment force application plate affixed to a first end of the nominal center wavelength and bandwidth selection optic; a second bending moment force application plate affixed to a second end of the nominal center wavelength and bandwidth selection optic; a bending moment drive shaft, e.g., the compression spring shaft, mounted for movement in a longitudinal axis direction with respect to the first force application plate, e.g., by being threaded and threadedly engaging a bushing fixed in positional relationship to the first bending moment force application plate, e.g., a BCD end plate. A bending moment force application housing may be affixed, e.g., by a rotational shaft on the ABCD end plate inserted through flange on the housing, to the second force application plate (ABCD end plate); a bending moment force application spring expanding or contracting in response to movement of the drive shaft relative to the first force application plate, which may include two springs and an intermediate piston. It will be understood, as explained above, that rotation of the shaft seeks to move the end plates with respect to each other, one directly connected to one end plate through the threaded bushing to which the shaft is threadedly engaged and in which the shaft is rotating, and through the housing connected to the shaft by the piston and spring(s). This setting may be optimized for bandwidth output of the laser system, e.g., by measuring bandwidth over a series of positions of the piston (turns of the shaft), e.g., with the laser in different conditions of operation, e.g., hot or cold, and selecting, e.g., a minimum bandwidth point on the curve, and fixed at that point, e.g., during manufacture and/or periodically in the field as a maintenance operation. The active wavefront compensation mechanism may a bending moment force application mechanism connected to the bending moment drive shaft and applying a bending moment to the wavelength and bandwidth selection optic by moving the bending moment drive shaft without further changing the position of the drive shaft with respect to the first force application plate. That is, the fixed (manual) setting just described does not change due to the independent force application of the active wavefront compensation mechanism, operating in response to feedback from a bandwidth monitor, because the force for active bandwidth control is not applied in the same was as the manual force setting, i.e., by rotating the shaft. That is, the static (manual) wavefront compensation mechanism, threadedly engaging the drive shaft to the first force application plate and with a mechanism for rotating the drive shaft (by hand or by motor, e.g., by a connection through the LNM housing wall, applies force directly to the first force application end plate and indirectly through the housing and spring to the second force application end plate, which then sets a curvature for the grating, and the active wavefront compensation mechanism, responsive to essentially real time bandwidth error signals from a bandwidth controller utilizing a bandwidth monitor, may apply a different kind of bending force, e.g., by using a linear motion actuator, e.g., to try to move the shaft relative to the end plates, without applying force in the same way as the static wavefront curvature control mechanism, i.e., by rotating the shaft, e.g., by application of a force along the longitudinal axis of the shaft. The shaft being attached at one end to a grating force application plate, e.g., through the threaded engagement of the shaft to one end plate and to the other end plate, e.g., by the attachment of the linear actuator at one end thereof to the shaft and at the other end to the other force application end plate, can apply the separate wavefront (bandwidth) curvature force by attempting to expand or contract in the direction of the longitudinal axis of the shaft. Many linear actuators may suffice, as noted above, however, a pneumatic linear actuator is currently preferred due at least to the essentially complete elimination of thermal energy input into the LNM from the ABCD active actuator and therefore the essential elimination of LNM thermal transients.

A method and apparatus is disclosed for operating a laser output light beam pulse line narrowing mechanism that may comprise a nominal center wavelength and bandwidth selection optic; a static wavefront compensation mechanism shaping the curvature of the selection optic; an active wavefront compensation mechanism shaping the curvature of the selection optic and operating independently of the static wavefront compensation mechanism. The method and apparatus may comprise the nominal center wavelength and bandwidth selection optic comprises a grating; the static wavefront compensation mechanism applies a pre-selected bending moment to the grating; the active wavefront compensation mechanism applies a separate selected bending moment to the grating responsive to the control of a bending moment controller based on bandwidth feedback from a bandwidth monitor monitoring the bandwidth of the laser output light beam pulses. The active wavefront compensation mechanism may comprise a pneumatic drive mechanism. The apparatus and method may comprise the static wavefront compensation mechanism comprising: a first bending moment force application plate affixed to a first end of the nominal center wavelength and bandwidth selection optic; a second bending moment force application plate affixed to a second end of the nominal center wavelength and bandwidth selection optic; a bending moment drive shaft mounted for movement in a longitudinal axis direction with respect to the first force application plate; a bending moment force application housing affixed to the second force application plate; a bending moment force application spring expanding or contracting in response to movement of the drive shaft relative to the first force application plate; the active wavefront compensation mechanism comprising: a bending moment force application mechanism connected to the bending moment drive shaft and applying a bending moment to the wavelength and bandwidth selection optic by moving the bending moment drive shaft without further changing the position of the drive shaft with respect to the first force application plate the static wavefront compensation mechanism may comprise a threaded connection of the drive shaft to the first force application plate and a mechanism for rotating the drive shaft with respect to the first force application plate; and the active wavefront compensation mechanism may comprise a linear motion actuator.

It will further be understood by those skilled in the art that the method and apparatus according to aspects of an embodiment of the present invention may also comprise a laser output light beam line narrowing mechanism which may comprise a nominal center wavelength and bandwidth selection optic, such as, e.g., a grating; a static wavefront compensation mechanism shaping the receiving face of the selection optic to a wavefront of the beam incident on the selection optic, which may be the grating or another optical element in the optical train, e.g., a pair of cylindrical lenses with adjustable separation; an active wavefront compensation mechanism shaping the wavefront of the beam incident on the selection optic and operating independently of the static wavefront compensation mechanism. The nominal center wavelength and bandwidth selection optic may comprise a grating; the static wavefront compensation mechanism may apply a pre-selected shape to the wavefront; the active wavefront compensation mechanism may apply a separate selected shape to the wavefront responsive to the control of a wavefront shape controller based on bandwidth feedback from a bandwidth monitor monitoring the bandwidth of the laser output light beam pulses, e.g., by bending the selection optic, bending another optic in the optical train or otherwise adjusting wavefront, e.g., by changing relative position between optical elements, e.g., cylindrical lenses in the optical train. The active wavefront compensation mechanism may comprise a pneumatic drive mechanism. The static wavefront compensation mechanism may comprise a static wavefront correction mechanism operatively connected to a wavefront sensitive optical element, e.g., the grating or one of the other mentioned optical elements, e.g., in the optical path, to apply a wavefront correction having a wavefront correction setting; the active wavefront compensation mechanism may comprise an active wavefront correction mechanism operatively connected to the wavefront sensitive optical element, e.g., the grating or one of the other optical elements mentioned, to make a wavefront correction without affecting the wavefront correction setting of the static wavefront compensation mechanism. The wavefront compensation mechanism may the shape of the selection optic or one of the other optical elements mentioned above or change relative positions of optical elements to change wavefront. The wavefront compensation mechanism may modify a spatial relationship between at least one pair of optical elements in the path of the beam.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above others could be implemented.

While the particular aspects of embodiment(s) of the BANDWIDTH CONTROL DEVICE described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present BANDWIDTH CONTROL DEVICE is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

We claim:

1. A laser output light beam pulse line narrowing apparatus comprising:
    a nominal center wavelength and bandwidth selection optic;
    a passive wavefront compensation mechanism including a first actuator configured to adjustably shape the curvature of the nominal center wavelength and bandwidth selection optic; and
    an active wavefront compensation mechanism including a second actuator configured to shape the curvature of the nominal center wavelength and bandwidth selection optic based on a measured bandwidth of the laser output light beam of pulses, and to operate independently of a setting of the first actuator such that the first actuator setting remains fixed while the second actuator shapes the curvature.

2. The apparatus of claim 1, wherein:
    the nominal center wavelength and bandwidth selection optic comprises a grating;
    the first actuator is configured to apply a pre-selected bending moment to the grating; and
    the second actuator is configured to apply a separate selected bending moment to the grating responsive to the control of a bending moment controller based on bandwidth feedback from a bandwidth monitor monitoring the bandwidth of the laser output light beam of pulses.

3. The apparatus of claim 1, wherein:
    the second actuator comprises a pneumatic drive mechanism.

4. The apparatus of claim 1, wherein:
    the first actuator comprises:
        a first bending moment force application plate affixed to a first end of the nominal center wavelength and bandwidth selection optic;
        a second bending moment force application plate affixed to a second end of the nominal center wavelength and bandwidth selection optic;
        a bending moment drive shaft mounted for movement in a longitudinal axis direction with respect to the first force application plate;
        a bending moment force application housing affixed to the second force application plate; and
        a bending moment force application spring expanding or contracting in response to movement of the drive shaft relative to the first force application plate; and
    the active wavefront compensation mechanism comprises:
        a bending moment force application mechanism connected to the bending moment drive shaft and applying a bending moment to the nominal center wavelength and bandwidth selection optic by moving the bending moment drive shaft without further changing the position of the drive shaft with respect to the first force application plate.

5. The apparatus of claim 4, wherein:
    the first actuator comprises a threaded connection of the drive shaft to the first force application plate and a mechanism for rotating the drive shaft with respect to the first force application plate; and
    the second actuator comprises a linear motion actuator.

6. The apparatus of claim 1, wherein the second actuator operates independently of the first actuator setting so that the first actuator setting remains unmodified during active shaping of the curvature of the nominal center wavelength and bandwidth selection optic by the second actuator.

7. The apparatus of claim 1, wherein the setting of the first actuator remains adjustable during operation of the nominal center wavelength and bandwidth selection optic.

8. The apparatus of claim 1, wherein the first actuator is configured to permit the curvature of the nominal center wavelength and bandwidth selection optic to be manually shaped.

9. The apparatus of claim 1, wherein the first actuator comprises a drive shaft and a spring piston mounted on the drive shaft, and the setting of the first actuator is the position of the spring piston such that the spring piston position remains fixed while the second actuator shapes the curvature.

10. The apparatus of claim 9, wherein the second actuator is connected to the drive shaft to move the drive shaft along a longitudinal axis of the drive shaft without rotating the drive shaft to change the position of the drive shaft along the longitudinal axis with respect to the first actuator.

11. A laser output light beam pulse line narrowing apparatus comprising:
    a selection means for selecting a center wavelength and a bandwidth of a laser output light beam of pulses;
    a passive wavefront compensation means including a first actuation means for passively and adjustably shaping the curvature of the selection means; and
    an active wavefront compensation means including a second actuation means for actively shaping the curvature of the selection means based on a measured bandwidth of the laser output light beam of pulses, and for operating independently of a setting of the first actuation means such that the first actuation means setting remains fixed while the second actuation means shapes the curvature.

12. The apparatus of claim 11, wherein:
    the selection means comprises a grating;

the first actuation means comprises a means for applying a pre-selected bending moment to the grating; and
the second actuation means comprises a means for applying a separate selected bending moment to the grating responsive to the control of a bending moment controller based on bandwidth feedback from a bandwidth monitor monitoring the bandwidth of the laser output light beam of pulses.

13. The apparatus of claim 11, wherein:
the second actuation means comprises a pneumatic drive mechanism.

14. The apparatus of claim 11, wherein:
the first actuation means comprises:
  a first bending moment force application plate affixed to a first end of the selection means;
  a second bending moment force application plate affixed to a second end of the selection means;
  a bending moment drive shaft mounted for movement in a longitudinal axis direction with respect to the first force application plate; and
  a bending moment force application means affixed to the second force application plate, comprising a bending moment force application means for expanding or contracting in response to movement of the drive shaft relative to the first force application plate; and
the second actuation means comprises:
  a bending moment force application means connected to the bending moment drive shaft and comprising a means for applying a bending moment to the nominal center wavelength and bandwidth selection means by moving the bending moment drive shaft without further changing the position of the drive shaft with respect to the first force application plate.

15. The apparatus of claim 14, wherein:
the first actuation means comprises a means for applying force to the first force application plate through rotary motion of the drive shaft with respect to the first force application plate, and a means for rotating the drive shaft; and
the second actuation means comprises a linear motion actuation means for applying force to the first force application plate without rotating the drive shaft.

16. The apparatus of claim 11, wherein the setting of the first actuation means remains adjustable during operation of the nominal center wavelength and bandwidth selection means.

17. The apparatus of claim 11, wherein the first actuation means manually shapes the curvature of the nominal center wavelength and bandwidth selection means.

18. A method of operating a laser output light beam pulse line narrowing mechanism, the method comprising:
  passively adjusting a first actuator to thereby adjust a curvature of a nominal center wavelength and bandwidth selection mechanism;
  fixing a setting of the first actuator; and
  actively adjusting a second actuator independently of a setting of the first actuator to thereby shape the curvature of the nominal center wavelength and bandwidth selection mechanism while the first actuator setting remains fixed.

19. The method of claim 18, wherein:
the nominal center wavelength and bandwidth selection mechanism comprises a grating; and
passively adjusting a first actuator to thereby adjust a curvature of the nominal center wavelength and bandwidth selection mechanism comprises applying a pre-selected bending moment to the grating;
the method further comprising monitoring a bandwidth of the laser output light beam pulses, wherein actively adjusting a second actuator to thereby shape the curvature of the nominal center wavelength and bandwidth selection mechanism comprises applying a separate selected bending moment to the grating based on the monitored bandwidth.

20. The method of claim 18, wherein:
the second actuator comprises a pneumatic drive mechanism.

21. The method of claim 18, wherein:
the first actuator comprises:
  a first bending moment force application plate affixed to a first end of the nominal center wavelength and bandwidth selection mechanism;
  a second bending moment force application plate affixed to a second end of the nominal center wavelength and bandwidth selection mechanism;
  a bending moment drive shaft mounted for movement in a longitudinal axis direction with respect to the first force application plate; and
  a bending moment force application mechanism affixed to the second force application plate, comprising a bending moment force application mechanism for expanding or contracting in response to movement of the drive shaft relative to the first force application plate; and
the second actuator comprises:
  a bending moment force application mechanism connected to the bending moment drive shaft and comprising a mechanism for applying a bending moment to the nominal center wavelength and bandwidth selection mechanism by moving the bending moment drive shaft without further changing the position of the drive shaft with respect to the first force application plate.

22. The method of claim 21, wherein:
the first actuator comprises a mechanism applying force to the first force application plate through rotary motion of the drive shaft with respect to the first force application plate, and a mechanism rotating the drive shaft; and
the second actuator comprises a linear motion actuation mechanism applying force to the first force application plate without rotating the drive shaft.

23. The method of claim 18, wherein active adjustment of the second actuator independently of the first actuator comprises active adjustment of the second actuator while the first actuator setting remains fixed.

24. The method of claim 18, further comprising passively adjusting the first actuator after actively adjusting the second actuator.

25. The method of claim 18, wherein passively adjusting the first actuator comprises turning a drive shaft and fixing a setting of the first actuator comprises fixing a position of a spring piston that is mounted on the drive shaft.

26. The method of claim 25, wherein actively adjusting the second actuator comprises moving the drive shaft along a longitudinal axis of the drive shaft without rotating the drive shaft to change the position of the drive shaft along the longitudinal axis with respect to the first actuator while the spring piston position remains fixed.

27. A laser output light beam pulse line narrowing apparatus comprising:
  a nominal center wavelength and bandwidth selection optic;
  a passive wavefront compensation mechanism including a first actuator configured to adjustably shape a receiving face of the nominal center wavelength and bandwidth selection optic to a wavefront of the beam incident on the nominal center wavelength and bandwidth selection optic; and an active wavefront compensation mechanism including a second actuator configured to shape the wavefront of the beam incident on the nominal center wavelength and bandwidth selection optic based on a measured bandwidth of the laser output light beam of pulses, and to operate independently of a setting of the first actuator such that the first actuator setting remains fixed while the second actuator shapes the wavefront.

28. The apparatus of claim 27, wherein:
the nominal center wavelength and bandwidth selection optic comprises a grating;
the first actuator is configured to apply a pre-selected shape to the wavefront; and
the second actuator is configured to apply a separate selected shape to the wavefront responsive to the control of a wavefront shape controller based on bandwidth feedback from a bandwidth monitor monitoring the bandwidth of the laser output light beam of pulses.

29. The apparatus of claim 27, wherein:
the second actuator comprises a pneumatic drive mechanism.

30. The apparatus of claim 27, wherein:
the first actuator comprises:
  a passive wavefront correction mechanism operatively connected to a wavefront sensitive optical element to apply a wavefront correction having a wavefront correction setting; and
the second actuator comprises:
  an active wavefront correction mechanism operatively connected to the wavefront sensitive optical element, to make a wavefront correction without affecting the wavefront correction setting of the passive wavefront compensation mechanism.

31. The apparatus of claim 27, wherein:
the wavefront compensation mechanism modifies the shape of the nominal center wavelength and bandwidth selection optic.

32. The apparatus of claim 30, wherein:
the wavefront compensation mechanism modifies the shape of the nominal center wavelength and bandwidth selection optic.

33. The apparatus of claim 27, wherein:
the wavefront compensation mechanism modifies a spatial relationship between at least one pair of optical elements in the path of the beam.

34. The apparatus of claim 30, wherein:
the wavefront compensation mechanism modifies a spatial relationship between at least one pair of optical elements in the path of the beam.

35. A method of operating a laser output light beam line narrowing mechanism, the method comprising:
controlling nominal center wavelength and bandwidth selection using a nominal center wavelength and bandwidth selection optic;
passively adjusting a first actuator to thereby adjustably shape the wavefront of the beam incident on the nominal center wavelength and bandwidth selection optic;
fixing a setting of the first actuator;
measuring a bandwidth of the laser output light beam of pulses; and
based on the measured bandwidth and while the first actuator setting remains fixed, actively adjusting a second actuator independently of the setting of the first actuator to thereby shape the wavefront of the beam incident on the nominal center wavelength and bandwidth selection optic.

36. The method of claim 35, wherein:
the nominal center wavelength and bandwidth selection optic comprises a grating;
passively adjusting the first actuator comprises applying a pre-selected shape to the wavefront of the incident beam; and
actively adjusting the second actuator comprises applying a separate selected shape to the wavefront of the incident beam responsive to the control of a wavefront shape controller based on bandwidth feedback from a bandwidth monitor monitoring the bandwidth of the laser output light beam of pulses.

37. The method of claim 35, wherein:
the second actuator comprises a pneumatic drive mechanism.

38. The method of claim 37, wherein:
the first actuator comprises:
  a passive wavefront correction mechanism operatively connected to a wavefront sensitive optical element to apply a wavefront correction having a wavefront correction setting; and
the second actuator comprises:
  an active wavefront correction mechanism operatively connected to the wavefront sensitive optical element, to make a wavefront correction without affecting the wavefront correction setting of the first actuator.

39. The method of claim 38, wherein:
the wavefront compensation mechanism modifies the shape of the nominal center wavelength and bandwidth selection optic.

40. The method of claim 38, wherein:
the wavefront compensation mechanism modifies a spatial relationship between at least one pair of optical elements in the path of the beam.

41. The apparatus of claim 27, wherein the second actuator operates independently of the first actuator setting so that the first actuator setting remains fixed during the active shaping of the beam wavefront.

42. The apparatus of claim 27, wherein the first actuator setting remains adjustable during operation of the nominal center wavelength and bandwidth selection optic.

43. The apparatus of claim 27, wherein the first actuator is configured to permit the receiving face of the nominal center wavelength and bandwidth selection optic to be manually shaped.

44. The method of claim 35, further comprising maintaining a setting of the first actuator during active adjustment of the second actuator.

45. The method of claim 35, further comprising passively adjusting the first actuator after actively adjusting the second actuator.

* * * * *